(12) United States Patent
Vetter et al.

(10) Patent No.: US 10,095,208 B2
(45) Date of Patent: Oct. 9, 2018

(54) METHOD FOR IMPLEMENTING AT LEAST ONE ADDITIONAL FUNCTION OF A FIELD DEVICE IN AUTOMATION TECHNOLOGY

(75) Inventors: Immanuel Vetter, Sinzheim (DE); Michael Gunzert, Herxheim (DE)

(73) Assignee: CODEWRIGHTS GMBH, Karlsruhe (DE)

( * ) Notice: Subject to any disclaimer, the term of this patent is extended or adjusted under 35 U.S.C. 154(b) by 732 days.

(21) Appl. No.: 13/307,409

(22) Filed: Nov. 30, 2011

(65) Prior Publication Data
US 2012/0143586 A1    Jun. 7, 2012

(30) Foreign Application Priority Data
Dec. 1, 2010    (DE) .................. 10 2010 062 266

(51) Int. Cl.
G06F 13/10        (2006.01)
G05B 19/042       (2006.01)
G05B 19/418       (2006.01)

(52) U.S. Cl.
CPC ..... G05B 19/042 (2013.01); G05B 19/41845 (2013.01); *G05B 2219/31132* (2013.01); *G05B 2219/32144* (2013.01); *Y02P 90/16* (2015.11); *Y02P 90/86* (2015.11)

(58) Field of Classification Search
None
See application file for complete search history.

(56) References Cited

U.S. PATENT DOCUMENTS 7,702,774 B2 *   4/2010  Birkhofer et al. ............ 709/223
7,941,581 B2 *   5/2011  Schwalbe et al. ............ 710/105
8,538,719 B2 *   9/2013  Vetter et al. ................... 702/119
2001/0034567 A1*  10/2001  Allen et al. .................... 700/283
2003/0131226 A1*  7/2003  Spencer et al. ............... 713/100
2003/0195653 A1*  10/2003  Lewis et al. ................... 700/236

(Continued)

FOREIGN PATENT DOCUMENTS

DE           10157323 A1    6/2003
DE      102006062478 A1 *   7/2008    ............. G06F 17/50

(Continued)

OTHER PUBLICATIONS

Zheng et al. OPC (OLE for Process Control) Specification and Its Developments SICE02-0806, Aug. 2002, pp. 917-920.*

(Continued)

*Primary Examiner* — Aniss Chad
*Assistant Examiner* — Cuong V Luu
(74) *Attorney, Agent, or Firm* — Bacon & Thomas, PLLC

(57) ABSTRACT

A method for implementing at least one additional function of a field device in automation technology, wherein the field device is parametered and/or configured via a servicing device using a device description, wherein the method has the following method steps: the original device description, which comprehensively describes the field device, is made available; the original device description is expanded by a script or a supplemental device description fragment; wherein the script or the device description fragment comprehensively describes the additional function; and the field device is serviced from the servicing device by means of the expanded device description and is able to execute the additional function.

15 Claims, 2 Drawing Sheets

(56) References Cited

U.S. PATENT DOCUMENTS

| | | | |
|---|---|---|---|
| 2005/0071522 A1* | 3/2005 | DeGroot | 710/15 |
| 2006/0064491 A1* | 3/2006 | Ebert et al. | 709/226 |
| 2008/0288613 A1* | 11/2008 | Birkhofer et al. | 709/220 |
| 2008/0313629 A1* | 12/2008 | Vetter et al. | 717/174 |
| 2008/0320402 A1* | 12/2008 | Isenmann et al. | 715/762 |
| 2009/0157695 A1* | 6/2009 | Roberts | 707/10 |
| 2009/0177249 A1* | 7/2009 | Roberts et al. | 607/60 |
| 2009/0177769 A1* | 7/2009 | Roberts | 709/224 |
| 2009/0177970 A1* | 7/2009 | Jahl et al. | 715/735 |
| 2009/0319062 A1* | 12/2009 | Schwalbe | 700/86 |
| 2011/0046775 A1* | 2/2011 | Bailey et al. | 700/224 |

FOREIGN PATENT DOCUMENTS

| | | |
|---|---|---|
| DE | 10 2007029136 A1 | 1/2009 |
| DE | 102007059671 A1 | 6/2009 |
| DE | 102008043095 A1 | 4/2010 |
| DE | 102009028195 A1 | 2/2011 |

OTHER PUBLICATIONS

Martin Zienlinski Digital Fieldbus Installation Use EDDL Technology for Simplicity with Advanced, Full Functionality Computing and Control Engineering, 2004—IET.*

German Search Report.

* cited by examiner

METHOD FOR IMPLEMENTING AT LEAST ONE ADDITIONAL FUNCTION OF A FIELD DEVICE IN AUTOMATION TECHNOLOGY

TECHNICAL FIELD

The invention relates to a method for implementing at least one additional function of a field device in automation technology, wherein the field device is parametered and/or configured via a servicing device using device descriptions.

BACKGROUND DISCUSSION

Field devices, which serve to register and/or influence process variables, are often applied in process as well as manufacturing, automation technology. Measuring devices, such as, for example, fill level measuring devices, flow measuring devices, pressure and temperature measuring devices, pH measuring devices, conductivity measuring devices, etc., serve to register the corresponding process variables, fill level, flow, pressure, temperature, pH value, or conductivity. Actuators, such as valves or pumps, are used to influence process variables, e.g. the flow of a liquid in a pipeline or the fill level of a medium in a container is changed via the actuator. Thus, the term 'field devices' subsumes all types of measuring devices and actuators in connection with the invention.

Additionally, all devices, which are applied near to the process and which deliver or process information relevant to the process, are also referred to as field devices in relation to the invention. Besides the measuring devices/sensors and actuators named above, units such as e.g. remote I/Os, gateways, linking devices and wireless adapters or radio adapters, which are directly connected to a fieldbus and which serve for communication with a superordinated unit, are generally also referred to as field devices. A large number of such field devices are produced and sold by the Endress+Hauser group of companies.

In modern industrial plants, communication between at least one superordinated control unit and field devices occurs, as a rule, via a bus system such as, for example, Profibus® PA, Foundation Fieldbus® or HART®. The bus systems can be wireless as well as hardwired. The superordinated control unit serves for process control, process visualization, process monitoring as well as for start up and servicing of the field devices and is also referred to as a configuration/management system.

The integration of field devices in configuration or management systems occurs via device descriptions, which ensure that the superordinated control units can detect and interpret the data delivered by the field devices. As a rule, the device descriptions for each field device type or for each field device type in different applications are provided by the pertinent device manufacturer. In order to enable the integration of field devices into different fieldbus systems, different device descriptions must be created for different fieldbus systems. Thus there are device descriptions for HART, Fieldbus Foundation and Profibus, to name just a few examples. The number of device descriptions is very large;—this is a result of the large number of different field devices or field device types in different applications and bus systems.

For the purpose of creating a universal description language for field devices, Fieldbus Foundation (FF), the HART Communication Foundation (HCF) and the Profibus User Organization (PNO) have created a unified electronic device description language (Electronic Device Description Language EDDL). The EDDL or the corresponding Electronic Device Description EDD is defined in the standard, IEC 61804-2.

Becoming ever more important in automation technology is the topic of industrial Ethernet. Examples of industrial Ethernet include: HSE, ControlNet, Industrial IP, Profi-Net, HART UDP/TCP, . . . . Field devices, which are connected to a superordinated control unit via an industrial Ethernet, also usually make use of a web server. This web server enables servicing, thus especially configuring, parametering or diagnosing of a field device, by means of a Web browser. In principle, the servicing of field devices is only possible online via a service unit connected, or connectable, to the field device. Until now, no method has been known as to how an offline field device, thus without integration into the industrial Ethernet, can be serviced.

Besides the device descriptions described above, so called Device Type Managers (DTM) or device managers or device drivers are applied; these require an FDT frame as a runtime environment. DTMs serve for comprehensive servicing of field devices and correspond to the FDT—Field Device Tool—specification. The FDT specification representing the industrial standard corresponds to an interface specification and was developed by PNO—Profibus User Organization—in cooperation with the ZVEI—Zentralverband Elektrotechnik und Elektroindustrie (German Electrical and Electronics Industry.) The respectively current FDT specification is obtainable from the ZVEI, the PNO, or the FDT Group.

In order to be able to utilize the device descriptions comprehensively in FDT environments or also in FDI environments, the device descriptions must be appropriately expanded so that they can perform e.g. also an offline parametering, or offline configuration and uploading/downloading. For this, it is necessary to adapt all device descriptions already present and to expand all device descriptions relative to the functions mentioned above. Correspondingly equipping the extensive device driver libraries is associated with an extremely high developmental effort.

SUMMARY OF THE INVENTION

An object of the invention is to provide an upgrade to the original device descriptions in a simple manner so that they reliably fulfill desired additional functions.

According to the invention, the object, as regards the method, is achieved by the following method steps:

The original device description, which comprehensively describes the field device, is made available;

the original device description is expanded to include a script or a supplemental device description fragment, wherein the script or the device description fragment comprehensively describes at least one additional function; and the field device is serviced from the servicing device by means of the expanded device description and is able to execute the additional function.

Of course, a software module based on the original device description can be used in place of the original device description. The script can be, for example, a partial device description or a Visual Basic script or a Java script, via which the additional function, especially upload and/or download, is implemented. In such case, it is especially provided that the partial device description jointly uses information from the original device description.

An advantageous embodiment of the method of the invention provides that the script or the additional device description fragment is added to the original device description. The addition of the script or the additional device description fragment need not occur during the development of the software, but, instead, can be performed in an already installed application automatically or after a request by operating personnel. In principle, a technology is used here as it is known in the use of macros in Microsoft Windows.

As already mentioned above, an upload/download of device data and/or of individual parametering/configuration data is preferably implemented via the additional function. Furthermore, an offline parametering of the field device can be replaced or expanded via the additional function.

Alternatively, predictive maintenance of the field device can also be realized by the additional function. It is seen as especially advantageous in relationship to the method of the invention when a software module, which permits the creation of the script self sufficiently and/or customer specifically, is made available to the user. With this, the creation of desired additional functions is given a greatest possible flexibility.

In an advantageous embodiment of the method of the invention, it is provided that a device description written in one of the standardized languages of automation technology is used as an original device description or that a software module, which is based on the device description produced in a standardized language, is used as an original device description.

A preferred embodiment of the method of the invention provides that an interpreter is provided in the servicing device. The information from the device description is utilized by the script or the additional device description fragment, in order to activate the additional function via the interpreter.

An alternative embodiment of the method of the invention provides that the interpreter makes its information on the device description available via a web server and the additional function is executed in the web browser.

A preferred arrangement for performing the method of the invention comprises a servicing device, a number of field devices connected via a data bus and an interpreter, which is associated with the servicing device; wherein servicing, e.g. configuring, parametering and/or diagnosing of field devices, occurs via the servicing device.

Preferably, the servicing device is connected to an automation/integration platform, especially an OPC-UA server. An OPC server or an OPC-UA server offers the opportunity to give industrial bus systems and protocols a universal ability to communicate with one another. It is used where sensors and controllers (field devices) of various manufacturers (or of the same manufacturer) form a common network. With OPC, it suffices for each field device, as defined in greater detail in the introduction of the description, to write a driver conforming to OPC exactly once; the driver can be integrated in as many large control and monitoring systems as desired without a great adaptation effort.

Furthermore, it is provided that the interpreter makes the information on the device description available via a web server, wherein the additional function is executed in a web browser. Preferably, the web server executing the device description is integrated in the field device.

BRIEF DESCRIPTION OF THE DRAWINGS

The invention will now be explained in greater detail based on the appended drawing, the figures of which show as follows. It shows.

DETAILED DISCUSSION IN CONJUNCTION WITH THE DRAWINGS

Figure 1:
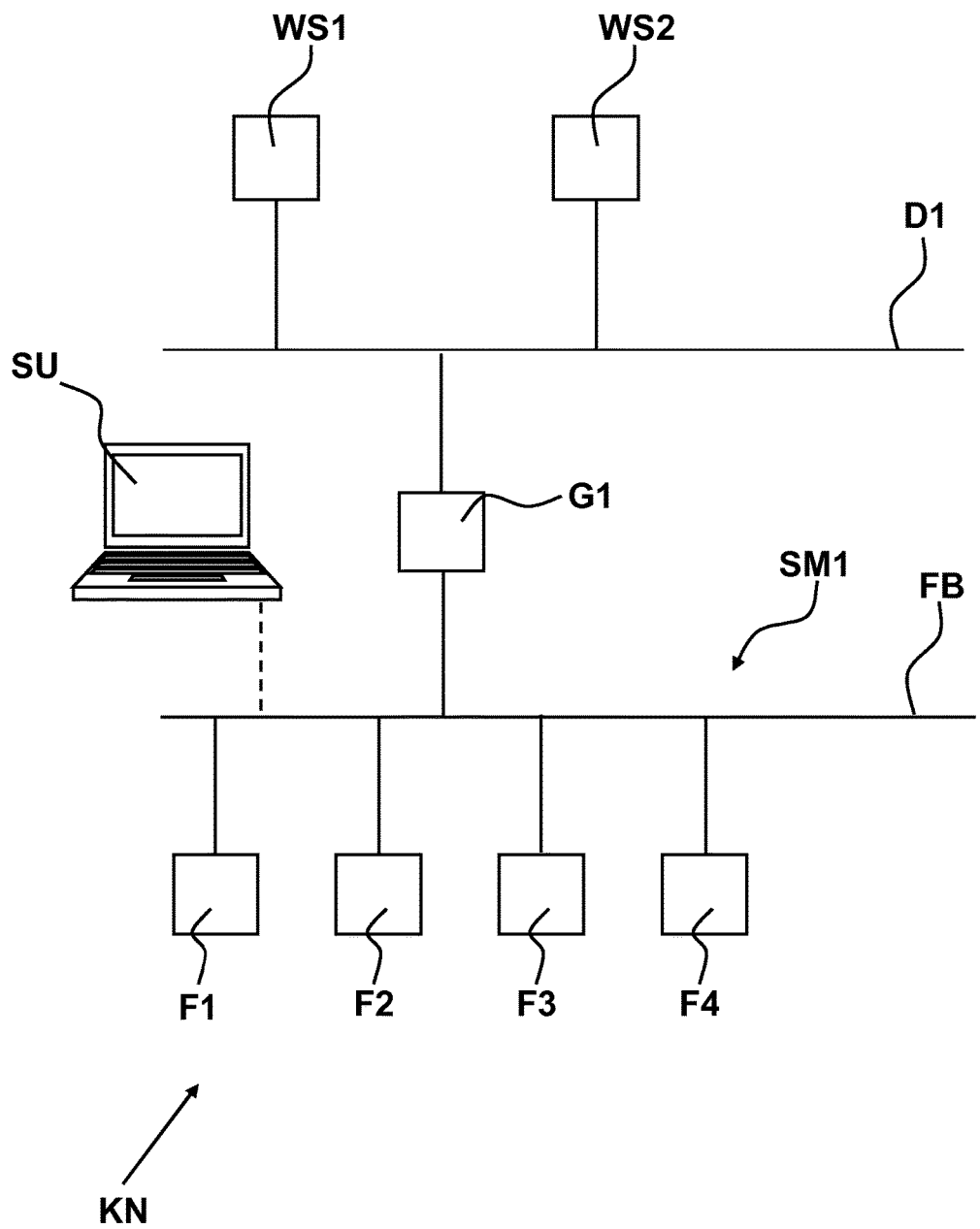
FIG. 1 is a schematic representation of a communication network KN, as is used e.g. in process automation.

FIG. 1 schematically shows a communication network KN, as is used e.g. in process automation. Here, a number of control units (workstations, host computers, or, generally, clients) WS1, WS2 are connected to a data bus D1 of the control level. These control units WS1, WS2 serve as superordinated units or control structures (control system, master control, control unit, servicing device SU) for visualizing the process, monitoring the process and for engineering, however, also for servicing and monitoring field devices F1, F2, F3, F4. Of course, even one of the control units WS1, WS2, SU can be sufficient. The servicing device SU, e.g. the servicing device FieldCare of the Endress+Hauser group, can likewise be arranged on the control system level or on the field level.

The data bus D1 is a fast data bus, on which data are transmitted at high transmission rates. The data bus D1 meets, for example, the Profibus® DP standard, the HSE "High Speed Ethernet" standard of the FOUNDATION Fieldbus®, the HART standard or one of the known standards used in automation technology. In the example illustrated, the data bus D1 is connected to at least one fieldbus segment SM1 via a gateway G1, which is also referred to as a linking device or segment coupler. Of course, in the context of the invention, the superordinated control unit can also directly communicate with the field devices of the fieldbus level.

The fieldbus segment SM1 comprises a number of field devices F1, F2, F3, F4, which communicate with one another via a relatively slow fieldbus FB, e.g. HART, Profibus PA, . . . . The field devices F1, F2, F3, F4, are sensors and/or actuators or other components accessible via a fieldbus D; FB. Corresponding field devices F1, F2, F3, F4 are described at length in the introduction of the description. A portable servicing unit SU, e.g. a laptop, a PDA, a Palm, a cell phone or another operating element, is usually temporarily connected, or connectable, to the fieldbus FB by wire or wirelessly. Operating personnel have access to the individual field devices F1, F2, F3, F4, via this servicing unit SU. For example, the servicing, or operating, tool is a FieldCare tool available from and sold by the Endress+Hauser group.

Figure 2:
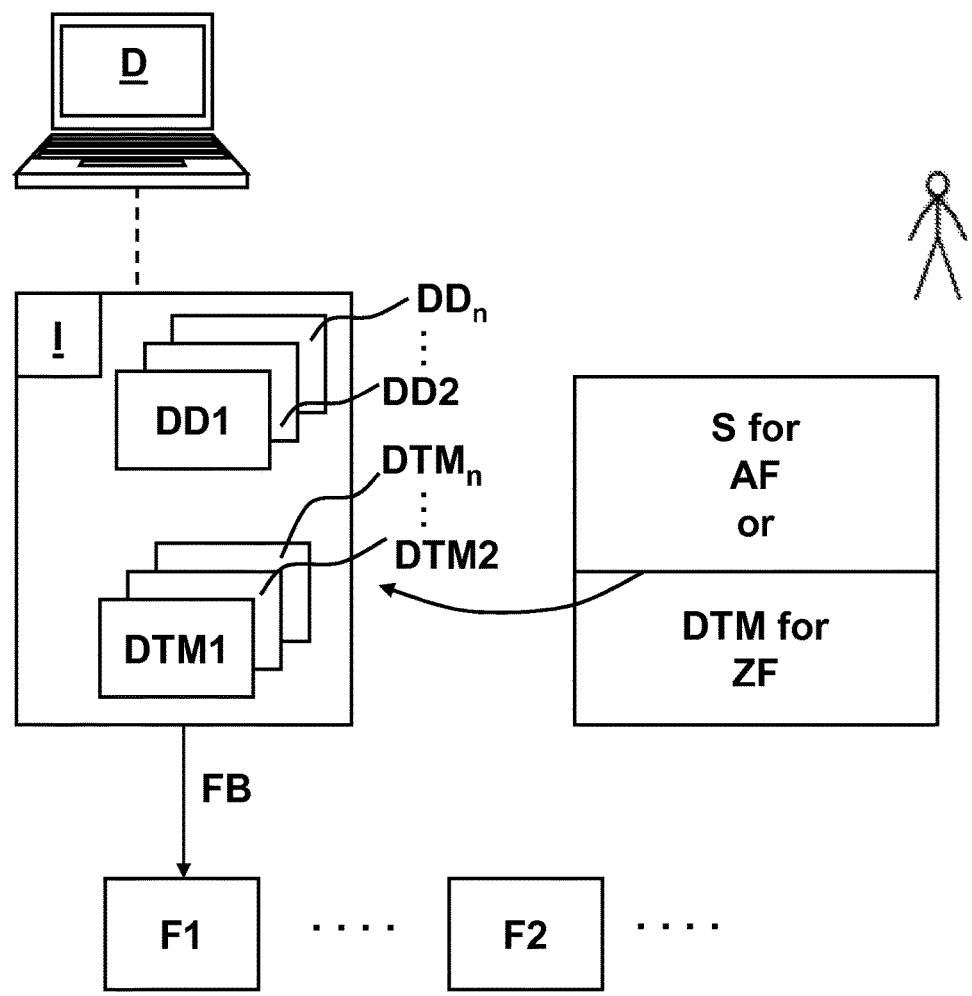
FIG. 2 is a schematic representation of a first embodiment of the arrangement of the invention.

FIG. 2 shows a schematic representation of a first embodiment of the arrangement of the invention for performing the method of the invention. In the case illustrated, the arrangement comprises a servicing device SU, a number of field devices F1, F2, . . . connected via a data bus FB and an interpreter I. The interpreter I is preferably associated with the servicing device SU, wherein the servicing of the field devices F1, F2, . . . occurs via the servicing device SU. Servicing the field device F1, F2, . . . is understood quite generally to be parametering or configuring the field devices as well as performing a diagnosis on at least one of the field devices F1, F2, . . . . In the simplest case, the representation of information concerning the field device F1, F2, . . . on a display D is also understood as servicing the field device F1, F2, . . . . It is preferable that the servicing device SU is connected to an automation/integration platform, especially an OPC-UA server or an OPC server With the arrangement described above, the method of the invention is performed with the following method steps:

The original device description DD1, DD2, ..., which comprehensively describes the field device (F1, F2, ...), is made available;

the original device description DD1, DD2, ... is expanded by a script S or a supplemental device description fragment, wherein the script S or the device description fragment comprehensively describes the additional function AF; and the field device F1, F2, ... is serviced from the servicing device SU by means of the expanded device description DD1AF, DD2AF, ... and is able to execute the additional function AF.

Preferably, the method of the invention comes into use when the servicing device SU accesses the field device F1, F2, ... for the first time.

The information concerning the additional function AF from the device description DD1, DD2, ... is utilized by the script S or the additional device description fragment, in order to activate the additional function AF via the interpreter I.

The invention claimed is:

1. A method for implementing at least one additional function of a field device in automation technology, wherein the field device is parametered and/or configured via a servicing device using a device description, wherein the method comprises the following steps:

an electronic device description defined according to the standard IEC 61804-2, which describes the field device, is made available;

the electronic device description is expanded by a script or a supplemental device description fragment, wherein the script or the supplemental device description fragment describes the additional function; and the field device is serviced from the servicing device using the expanded electronic device description and is able to execute the additional function.

2. The method as claimed in claim 1, wherein:
the script or the supplemental device description fragment is added to the electronic device description as soon as the servicing device accesses the field device for the first time.

3. The method as claimed in claim 1, wherein:
the addition of the script or the additional device description fragment occurs automatically or after a request by operating personnel.

4. The method as claimed in claim 1, wherein:
an upload/download of device data and/or of individual parametering/configuration data is implemented via the additional function.

5. The method as claimed in claim 1, wherein:
an offline parametering of the field device is replaced or expanded by the additional function.

6. The method as claimed in claim 1, wherein:
predictive maintenance of the field device is realized by the additional function.

7. The method as claimed in claim 1, wherein:
a software module is made available, which enables a user to create the script self-sufficiently and/or customer specifically.

8. The method as claimed in claim 1, wherein:
the device description, which is written in a standardized language of automation technology, is used as the electronic device description or used as the electronic device description is a software module, which is based on the device description produced in a standardized language.

9. The method as claimed in claim 1, wherein:
an interpreter is provided in the servicing device; and
the information concerning the additional function from the device description is utilized by the script or the additional device description fragment, in order to activate the additional function via the interpreter.

10. The method as claimed in claim 1, wherein:
the interpreter makes its information on the device description available via a web server and the additional function is executed in the web browser.

11. The method as claimed in claim 10, wherein:
the web server executing the device description is executed in the field device.

12. An arrangement for implementing at least one additional function of a field device in automation technology, wherein the field device is parametered and/or configured via a servicing device using a device description, an electronic device description defined according to the standard IEC 61804-2, which describes the field device, is made available; the electronic device description is expanded by a script or a supplemental device description fragment, wherein the script or the supplemental device description fragment describes the additional function; and the field device is serviced from the servicing device using the expanded device description and is able to execute the additional function, the arrangement comprising:

a servicing device;
a plurality of field devices connected via a data bus; and
an interpreter, which is associated with said servicing device, wherein:
said servicing of the field devices occurs via said servicing device.

13. The arrangement as claimed in claim 12, wherein:
said servicing device is connected to an automation/integration platform.

14. The arrangement as claimed in claim 12, further comprising:
an interpreter, which makes the information on the device description available via a web server, wherein:
the additional function is executed in a web browser.

15. The arrangement as claimed in claim 12, wherein:
said servicing device is connected to an OPC-UA server.

* * * * *